United States Patent [19]
Tanaka et al.

[11] Patent Number: 4,736,225
[45] Date of Patent: Apr. 5, 1988

[54] SLIT EXPOSURE PROJECTION DEVICE

[75] Inventors: Masami Tanaka, Hirakata; Toshihide Dohi, Osaka, both of Japan

[73] Assignee: Minolta Camera Kabushiki Kaisha, Osaka, Japan

[21] Appl. No.: 1,919

[22] Filed: Jan. 8, 1987

Related U.S. Application Data

[63] Continuation of Ser. No. 885,968, Jul. 15, 1986, abandoned.

[30] Foreign Application Priority Data

Jul. 17, 1985 [JP] Japan .................. 60-157356
Jul. 17, 1985 [JP] Japan .................. 60-157357

[51] Int. Cl.[4] .............. G03B 27/48; G03B 27/50; G03B 27/70
[52] U.S. Cl. .......................... 355/1; 355/51
[58] Field of Search ................... 355/1, 51, 46

[56] References Cited

U.S. PATENT DOCUMENTS

| | | | |
|---|---|---|---|
| 3,241,438 | 3/1966 | Frank . | |
| 3,409,354 | 11/1968 | Frank | 355/1 |
| 3,584,950 | 6/1971 | Gundlach | 355/1 |
| 3,606,535 | 9/1971 | Koizumi | 355/51 |
| 3,609,024 | 9/1971 | Suzuki | 355/51 |
| 3,955,888 | 5/1976 | Kakiuchi et al. | 355/1 |
| 4,427,291 | 1/1984 | Day | 355/1 |

FOREIGN PATENT DOCUMENTS 56-138702 10/1981 Japan .
57-37326 3/1982 Japan .
59-151127 8/1984 Japan .

Primary Examiner—Monroe H. Hayes
Attorney, Agent, or Firm—Price, Gess & Ubell

[57] ABSTRACT

Disclosed is a projection device for projecting an image of an original on an object plane to an image plane for use in copying machines, facsimiles, image readers and the like. The projection device comprises a roof mirror and an optical member including a plurality of lens elements linearly aligned in the longitudinal direction of the slit. Each of the lens elements has a refractive surface and a reflective surface in facing relation with each other. At least one of said surfaces is toric in order to form an erecting real image in the longitudinal direction of the slit and an inverted real image in the lateral direction thereof.

19 Claims, 8 Drawing Sheets

SLIT EXPOSURE PROJECTION DEVICE

This is a continuation of application Ser. No. 885,968, filed July 15, 1986, now abandoned.

BACKGROUND OF THE INVENTION

The present invention relates to a slit exposure projection device for use in copying machines, facsimile systems, image readers and the like, and more particularly to a projection device including an array of lens elements and a roof mirror.

The projection lens commonly used for copying machines or the like has the advantage of a high resolving power, large focal depth and giving a variable magnification, whereas the lens has the drawback of a large conjugate length which renders the machine expensive and large-sized. Accordingly, various compact inexpensive projection devices have been proposed which comprise an array of small lenses.

These proposals include, for example, an arrangement wherein a plurality of small lenses are arranged on a common optical axis as a set, and a plurality of such sets are aligned to provide an array of small lenses. With such a small lens array, however, many small lenses need to be arranged on the optical axis in view of the aberration characteristics, while to assure the desired brightness, there is a need to use two or three arrays, which result in an increased cost. The arrangement then fails to fully shorten the distance between the object plane and the image plane.

It is also proposed to use an array of light transmission fibers of graded refractive indexes. The light transmission fiber is given by ion exchange a distribution of refractive indexes radially thereof, and the array comprises such fibers arranged side by side in a straight row. Although providing a shortened conjugate length between the object plane and the image plane, the array has the drawback of a great loss of quantity of light, small focal depth and high cost.

Another projection device is known which comprises an array of lenses and an array of roof mirrors disposed in the rear of the lens array separately therefrom and each having roof mirror faces for the corresponding lens. However, it is difficult to make the entire projection device uniform in image forming characteristics afforded by the combination of each lens and the corresponding mirror faces. The device has another drawback in that it is also difficult to accurately position the roof mirror array for the lens array.

SUMMARY OF THE INVENTION

Accordingly, the main object of the present invention is to provide a projection device having satisfactory image forming characteristics and diminished in the loss of quantity of light.

Another object of the present invention is to provide a projection device which is simple in construction, inexpensive and easy to produce.

These and other objects can be accomplished basically by a projection device for projecting an image of an original on an object plane to an image plane through slit exposure, the projection device comprising a roof mirror positioned between the object plane and the image plane and having a first mirror face opposed obliquely to the object plane and a second mirror face opposed obliquely to the image plane, and an optical member opposed to the roof mirror and including a plurality of lens elements linearly aligned in the longitudinal direction of the slit with a light blocking interface formed between the lens elements, said lens element having a toric refractive surface on the side facing the roof mirror and a reflective surface on the rear side, wherein the image light from the object plane enters the optical member through the first mirror face of the roof mirror and then emerges from the optical member to reach the image plane through the second mirror face of the roof mirror.

The term "toric surface" is used herein as including a cylindrical surface.

More specifically, the toric refractive surface has a refracting power longitudinally of the slit, and the projection device further includes a cylindrical lens disposed in the optical path, extending in the longitudinal direction of the slit and having a refracting power in a direction perpendicular to the longitudinal direction of the slit.

More specifically, the reflective surface of the lens element is in the form of a roof mirror face with a ridgeline extending perpendicular to the longitudinal direction of the slit.

The projection device of the present invention is generally characterized in that the combination of the roof mirror and the lens elements provides a shortened distance between the object plane and the image plane to thereby compact the device and in that substantially different optical surfaces individually afford image forming ability in the longitudinal direction of the slit and image forming ability in a direction perpendicular to the direction to form satisfactory images.

BRIEF DESCRIPTION OF THE DRAWINGS

These and other features of the present invention will become apparent from the following description of preferred embodiments thereof taken in conjunction with the accompanying drawings, in which.

In the following description, like parts are designated by like reference numbers throughout the several drawings.

DESCRIPTION OF THE PREFERRED EMBODIMENTS

Figure 1:
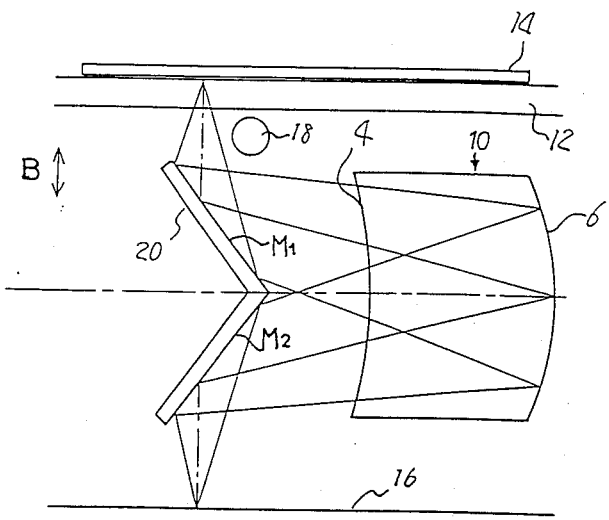
FIG. 1 is a view showing a projection device according to a first embodiment of the invention in section taken in a direction (hereinafter referred to as "direction B") perpendicular to the longitudinal direction of a slit.
Figure 2:
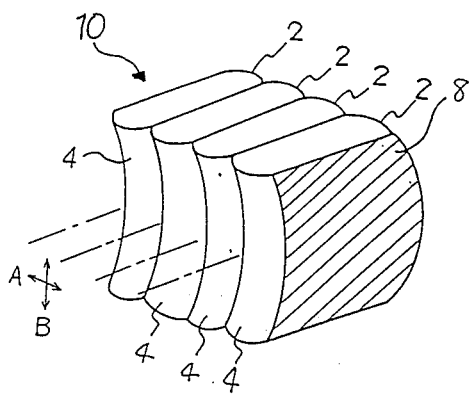
FIGS. 2 and 3 are perspective views respectively showing a lens array and a single lens for use in the first embodiment.
Figure 3:
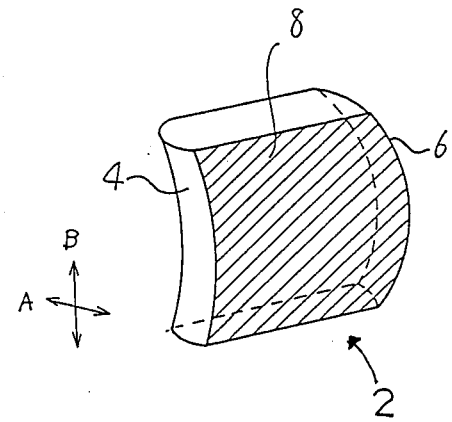

With reference to FIGS. 1 to 3, a first embodiment of the present invention will be described. FIG. 1 shows a transparent document support 12 which is movable rightward and leftward with an original 14 placed thereon. When the support 12 moves in one direction, an image of the original 14 is projected through slit exposure on an image plane 16 by a projection device of the present invention. The image plane 16 is the surface of a photosensitive medium in the case of a copying machine or the surface of a photodetector array in the case of a facsimile system or image reader. The original itself may be transported in one direction instead of the reciprocation of the original carrying support 12.

In the arrangement described above, the projection device of the invention is disposed between the image plane and the object plane. The projection device comprises a roof mirror 20 and a lens array 10 opposed to the roof mirror 20. As shown in FIG. 2, the lens array 10 comprises a plurality of approximately rectangular parallelepipidal thin lenses 2 linearly aligned in the longitudinal direction A of the slit. The direction B shown is perpendicular to the direction A and coincides with the direction of movement of the original 14. This direction B is illustrated as the vertical direction in the drawing.

The lens 2 has a first surface 4 (refractive surface) in the form of a toric surface which has in the direction A the main refracting power participating in the formation of images, and a second surface 6 (reflective surface) in the form of a toric surface which has in the direction B the main refracting power participating in the formation of images. The second surface 6 is a mirror face. The surface 8 of each lens 2 adjoining another lens 2 is treated to block light. Thus, a light blocking interface is formed between the adjoining lenses 2 for preventing cross talk therebetween.

With respect to the direction B, the beam emanating from an object point on the original 14 illuminated by a light source 18 passes through the transparent support 12, is then reflected from the face M1 opposed to the object of the roof mirror 20 and strikes the first surface 4 of the toric lens 2. The beam is reflected from the second surface, i.e. mirror face, 6 and emerges from the first surface 4, whereupon the beam is reflected at the face M2 opposed to the image plane of the roof mirror 20 and forms a life-size image on the image plane 16.

Figure 4:
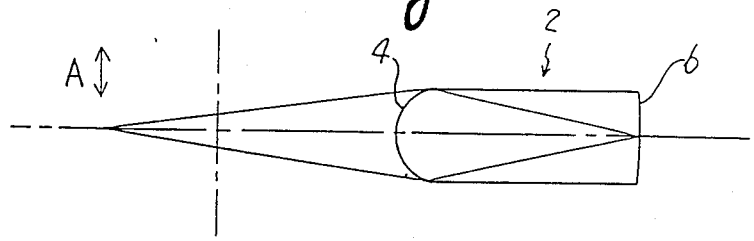
FIGS. 4 and 5 are views in section taken along the longitudinal direction of the slit (hereinafter referred to as "direction A") and showing the lens of the first embodiment to illustrate how an image is formed.

With respect to the direction A, the beam emanating from the object point is reflected from the object-side face M1 of the roof mirror 20, refracted at the first surface 4 of the toric lens 2 and forms an inverted real image in the vicinity of the second surface 6 as seen in FIG. 4. Through the first surface 4 of the lens 2 and the image-side face M2 of the roof mirror 20, the inverted real image is projected on the image plane 16 as an erect real image.

Figure 5:
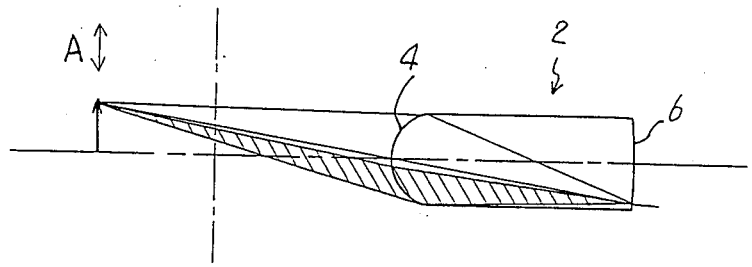

FIG. 5 shows that a point off the optical axis in the direction A is projected as an erect real image. The hatched portion of beam shown in FIG. 5 is projected onto the image plane 16 for image formation. The other beam portion is blocked by the light blocking surface 8 of the lens 2.

With the optical system shown in FIG. 1, an erect real image needs to be formed with respect to the direction A, whereas with respect to the direction B, no problem actually arises if an inverted image is formed on the image plane since the original is continuously scanned through a narrow slit (not shown). According to the present embodiment, therefore, the image forming ability with respect to the direction A is afforded substantially by the first surface, and the image forming ability with respect to the direction B substantially by the second surface. This makes it possible to design the lens with the greatest possible brightness, provided that the second surface is assured of image forming ability.

Stated more specifically, the radius of curvature in the direction A of the second surface of the toric lens can be so determined as to correct the curvature of field of the image surface to be formed by the first surface 4. It is then possible to obtain a lens array having excellent image forming ability or characteristics off the axis as well as on the axis. In this case, the eclipse of the beam off the axis diminishes, giving bright images of improved quality.

In the above case, a vignetting factor of approximately 100% is available even for rays off the axis in the direction A by making the radius of curvature of the second surface 6 smaller in the direction A than in the direction B and positioning the center of curvature of the second surface 6 in the direction A in the vicinity of the center of the lens (between the first and second surfaces in the direction of the axis). This obviates a reduction in the intensity of illumination off the axis to give very bright images.

Figure 6:
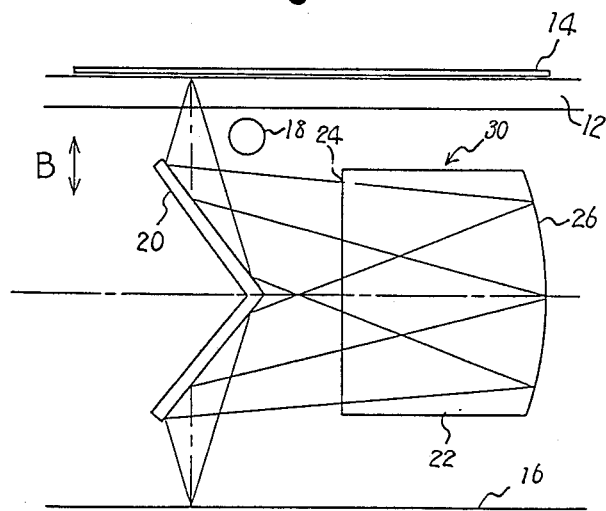
FIG. 6 is a view in section taken along the direction B and showing a projection device according to a second embodiment of the invention.
Figure 7:
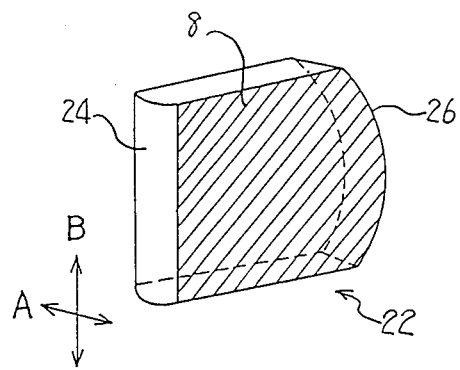
FIG. 7 is a perspective view showing a lens for use in the second embodiment.

FIG. 6 is a view in section taken along the direction B and showing a second embodiment of the present invention. This embodiment comprises toric lenses each having first and second surfaces of special toric configuration, i.e., cylinderical surfaces. Indicated at 30 in FIG. 6 is a lens array comprising a multiplicity of such toric lenses. FIG. 7 is a perspective view showing the toric lens of the second embodiment.

With reference to FIG. 7, the first surface 24 of the toric lens 22 is in the form of a cylindrical surface having an infinite radius of curvature in the direction B. The second surface 26 is in the form of a cylindrical surface which is infinite in the radius of curvature in the direction A and has a refracting power only in the direction B. Since the toric lens of this type is easy to make, the lens array can be obtained at a reduced cost.

Figure 8:
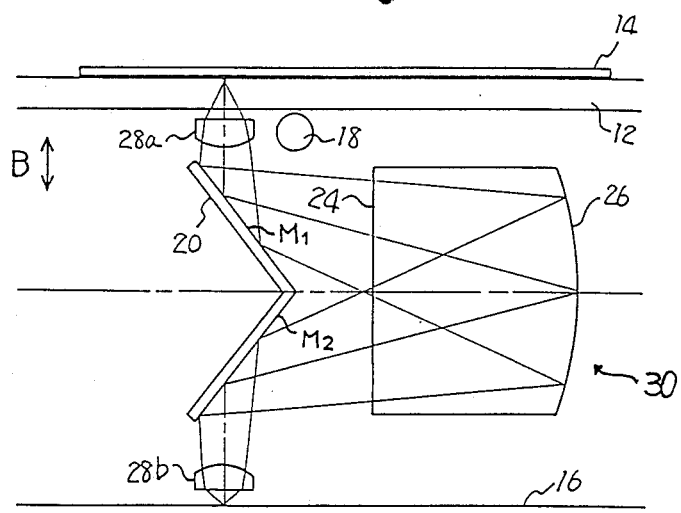
FIG. 8 is a view in section taken along the direction B and showing a projection device according to a third embodiment of the invention.

FIG. 8 is a view in section taken along the direction B and showing a third embodiment of the present invention. With this embodiment, cylindrical condenser lenses 28a and 28b are respectively provided above and below a roof mirror 20 substantially symmetrically with respect to the mirror 20. This arrangement affords an increased intensity of illumination in the direction B. The toric lenses for the lens array may be those of the first or second embodiment.

In these embodiments, the optical axis of the optical system or the optical axis through the two cylindrical condenser lenses 28a, 28b and the roof mirror 20 need not be perpendicular to the optical axis of the lens array. The angle of inclination of the roof mirror and the position of the optical axis of the object-side face, as well as the image-side face, of the mirror can be suitably determined according to the position of the object point and the image point.

FIGS. 9 to 12 show a fourth embodiment of the present invention, in which a lens array 40 provides image forming ability with respect to the direction A and which additionally includes a cylindrical lens 48 having image forming ability with respect to the direction B. For this purpose, the lens array 40 comprises a plurality of toric roof mirror lenses 42 arranged in a straight row in the direction A, while the cylindrical lens 48 extends in the direction A and has a refracting power in the direction B only.

Figure 11:
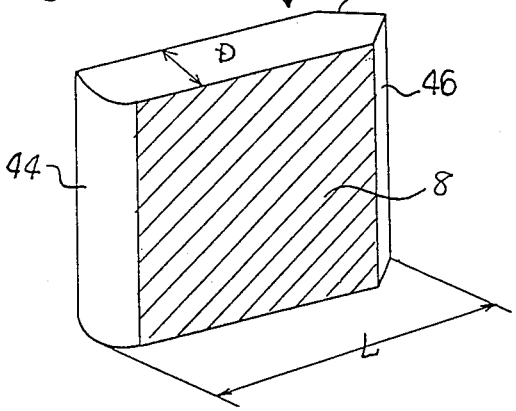

With reference to FIG. 11, each toric roof mirror lens 42 of the fourth embodiment is provided with a cylindrical surface 44 having a refracting power in the direction A only, roof mirror faces 46, 46 with a ridgeline extending in the direction B, and a light blocking surface 8 where the lens adjoins another lens 42.

The light reflected from the original illuminated by the light source 18 is reflected at the object-side reflective face M1 of the roof mirror 20, then incident on the toric roof mirror lenses 42 through the cylindrical lens 48, reflected at the roof mirror faces 46, emerges from the lenses 42, passes through the cylindrical lens 48 again and is projected through the image-size reflective face M2 of the roof mirror 20 to the image plane 16, forming an image thereon.

Figure 12:
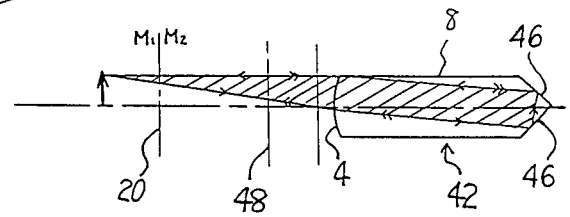
FIG. 12 is a view in section taken along the direction B and showing the lens of the fourth embodiment to illustrate how an image is formed.

With respect to the direction A in the above arrangement, the beam is not refracted by the cylindrical lens 48 but is refracted solely by the toric roof mirror lenses 42 to form an image on the image plane 16. With reference to FIG. 12, the beam from the object plane is made afocal at the cylindrical surface 44 of the toric roof mirror 42, inverted by the roof mirror faces 46, refracted again at the cylindrical surface 44 and consequently projected on the image plane 16 in the form of an erect real image.

With resepct to the direction B, on the other hand, the beam is made afocal by the cylindrical lens 48, reflected from the toric roof mirror lens 42 without refraction, refracted again at the cylindrical lens 48 and projected on the image plane 16 in the form of an inverted real image.

Figure 13:
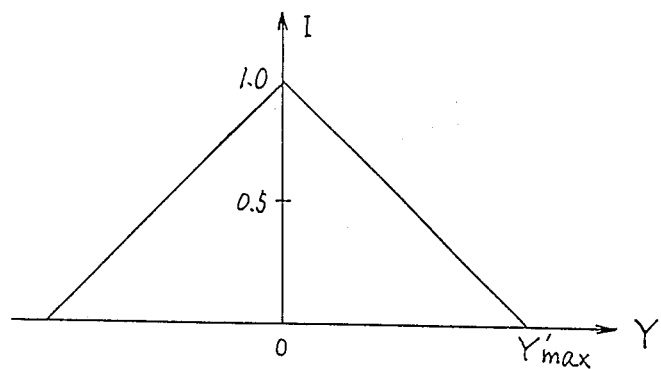
FIGS. 13 and 14 are graphs for illustrating the illuminance on the image plane of the fourth embodiment.
Figure 14:
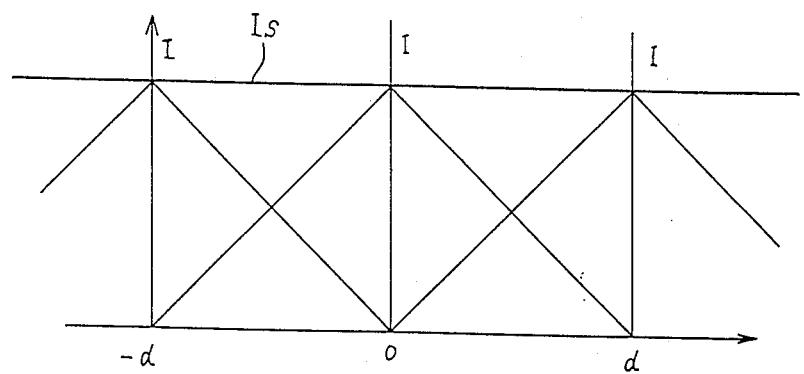

As shown in the graph of FIG. 13, the illuminance (relative illuminance) I on the image plane 16 is in proportion to the height (image height) Y from the optical axis on the original 14. The maximum image height Ymax is in inverse proportion to the distance L between the cylindrical surface 44 and the roof mirror faces 46 (see FIG. 11). Thus, the larger the distance L, the smaller is the maximum image height Ymax. Conversely, the maximum image height Ymax increases with decreasing distance L. If the maximum image height Ymax is made equal to the thickness D of the toric roof mirror lens 42 (see FIG. 11), the image plane illuminance I resulting from the combination of the multiplicity of lenses 42 becomes approximately uniform as indicated at Is in FIG. 14 showing the relative illuminance on the image plane in the scan direction. Accordingly, the system is adapted to provide images free of irregularities in illuminance.

Figure 15:
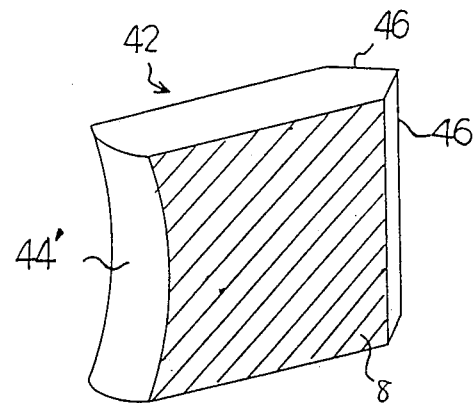
FIGS. 15 and 16 are perspective views showing modifications of the fourth embodiment.

The fourth embodiment may be modified as follows. First, the toric roof mirror lens 42 may have, instead of the cylindrical surface 44, a toric surface 44' having different refracting powers in the directions A and B as shown in FIG. 15. In this case, the refracting powers in the direction B of the cylindrical lens 48 and the toric surface 44' act in the direction B to form images.

Figure 16:
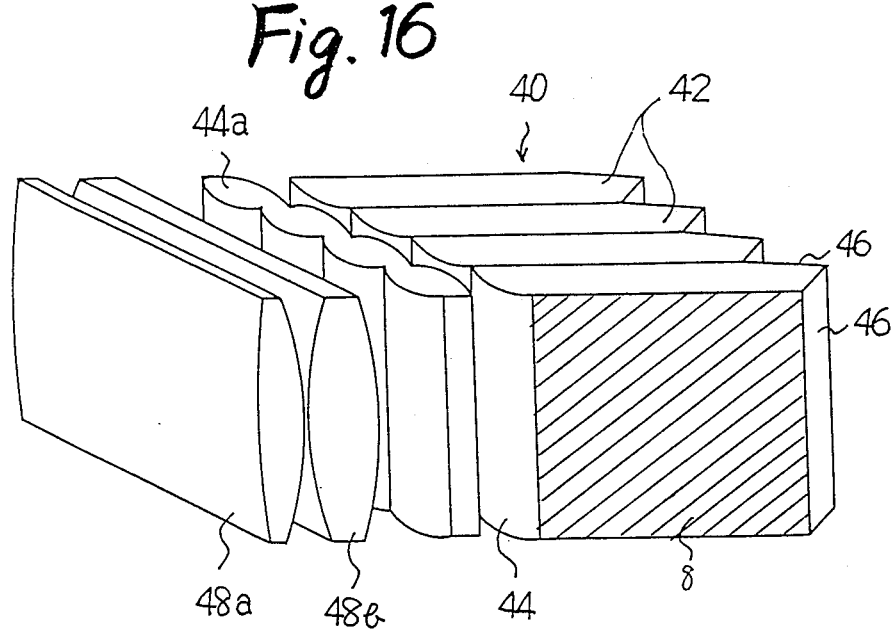

Second, the cylindrical lens 48 and/or the toric surface 44 need not be single. As seen in FIG. 16, cylindrical lenses 48a and 48b and/or the toric surface 44 or other toric lens array 44a may be used. Although these modifications have been described with reference to the fourth embodiment for the sake of convenience, it will be apparent that the other embodiments can be modified similarly.

Figure 9:
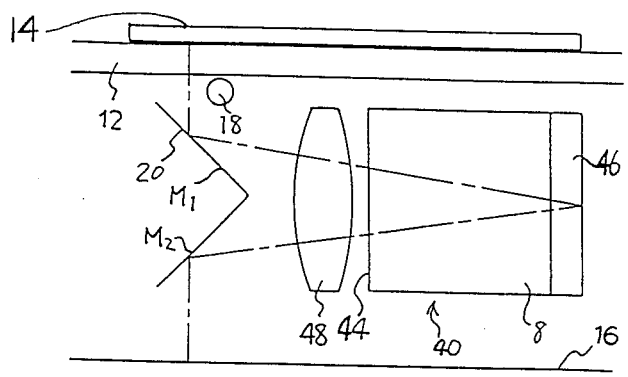
FIG. 9 is a view in section taken along the direction B and showing a projection device according to a fourth embodiment of the invention.
Figure 10:
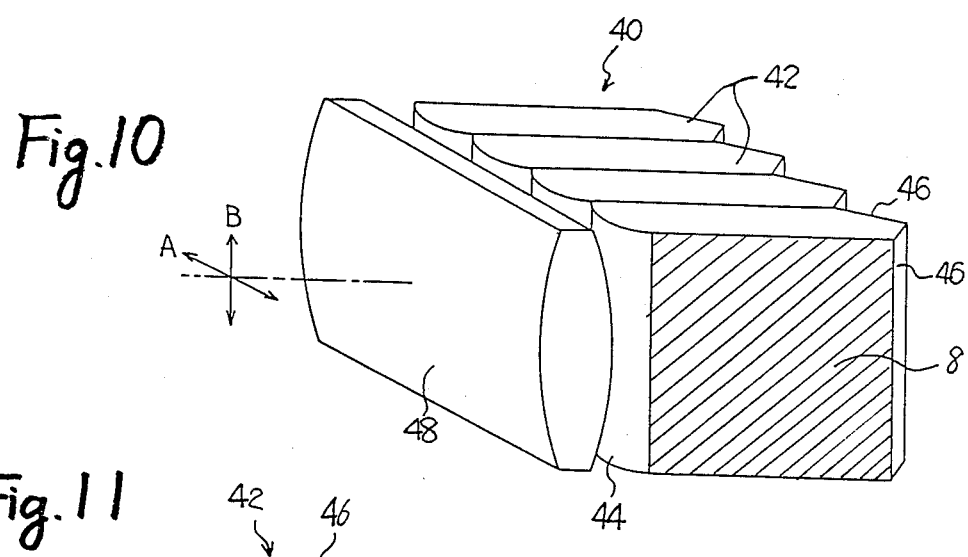
FIGS. 10 and 11 are perspective views respectively showing a lens array and a lens for use in the fourth embodiment.
Figure 17:
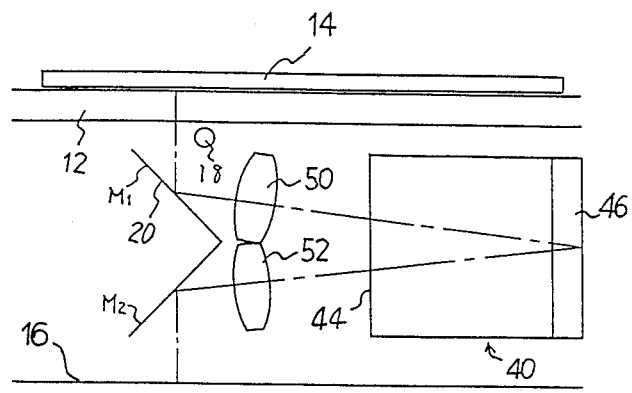
FIGS. 17, 18, 19 and 20 are views in section taken along the direction B and showing fifth, sixth, seventh and eighth embodiments, respectively, of the invention.

A fifth embodiment of the present invention will be described with reference to FIG. 17. With this embodiment, the single cylindrical lens 48 shown in FIG. 9 is replaced by a pair of cylindrical lenses 50 and 52 disposed perpendicular to the optical axis. These lenses 50 and 52 are respectively arranged between the object-side reflective face M1 of the roof mirror 20 and the toric roof mirror lens array 40 and between the image-side reflective face M2 of the mirror 20 and the lens array 40.

This arrangement assures facilitated correction of aberrations, further giving a smaller F number to the scanning optical system to provide brighter images.

Figure 18:
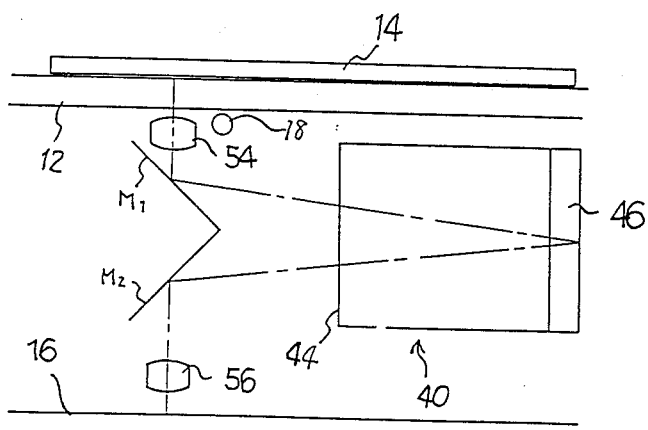

FIG. 18 shows a sixth embodiment, in which cylindrical lenses 54 and 56 are respectively provided between the original 14 and the object-side reflective face M1 of the roof mirror 20 and between the image-side reflective face M2 of the mirror 20 and the image plane 16. This arrangement gives the scanning optical system a smaller F number in the direction B to produce brighter images than the third embodiment, further decreasing the maximum image height Ymax in the direction B to reduce the quantity of flare and provide improved image forming characteristics.

Figure 19:
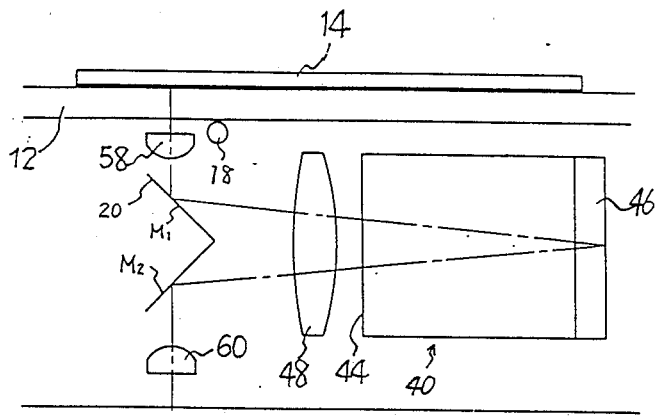

FIG. 19 shows a seventh embodiment of the invention, which includes cylindrical lenses 58 and 60 in addition to the cylindrical lens 48 in front of the toric roof mirror lens array 40 so as to give a reduced F number in the direction B and an increased quantity of light. The cylindrical lenses 58 and 60 are respectively disposed between the original 14 and the object-side reflective face M1 of the roof mirror 20 and between the image-side reflective face M2 of the mirror 20 and the image plane 16, approximately symmetrically with respect to the mirror 20. These cylindrical lenses 58 and 60 act as condenser lenses for converging the beam rather than aberration correcting means.

Figure 20:
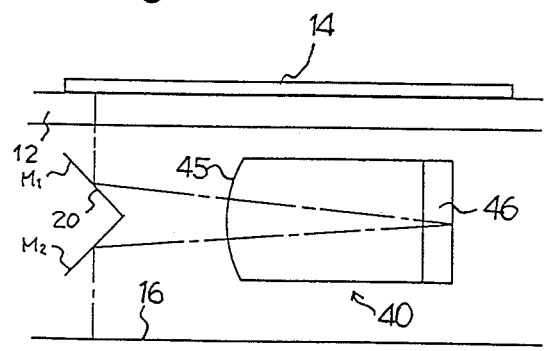

FIG. 20 shows an eighth embodiment of the invention, wherein the cylindrical surface 44 of the toric roof mirror lens array 40 is in the form of a toric surface 45 which is different in refracting power between the direction A and the direction B, instead of using a cylindrical lens. This embodiment requires no cylindrical lens and is therefore simpler in construction.

In the embodiments described above, the optical axis of the toric roof mirror lens array 40 need not be perpendicular to the optical axis of the scanning optical system. The angle of inclination of the roof mirror 20 and the position of the axis of the object-side mirror face, as well as the image-side mirror face, thereof may be determined as desired in accordance with the position of the object point and the image point.

Although the cylindrical surface of the cylindrical lens and the cylindrical surface of the toric roof mirror lens array of the foregoing embodiments are circular in section, the present invention is not limited to such section. When these cylindrical surfaces are noncircular, e.g. elliptical or parabolic, in section, it becomes possible to correct aberrations more effectively and to provide a greater vignetting factor, with the result that a brigher optical system can be obtained with improved image forming characteristics or ability.

With the foregoing embodiments, the surface of the original illuminated by a light source as in copying machines, facsimile systems or the like is considered to be the object plane, whereas the object plane may be the surface of a self-luminescent LED array or of a hot-cathode luminescent tube array. Also usable as the object plane is the surface of an optical shutter array incorporating liquid crystal or PLZT. The projection lens and condenser lens are not limited to glass lenses but may be plastics lenses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A projection device for projecting an image of an original on an object plane to an image plane through slit exposure comprising:

a roof mirror positioned between the object plane and the image plane and having a first mirror face opposed obliquely to the object plane and a second mirror face opposed obliquely to the image plane; and an optical member opposed to the roof mirror and including a plurality of lens elements linearly aligned in the longitudinal direction of the slit with blocking of the light between lens elements, said lens elements having a toric refractive surface on the side facing to the roof mirror and a reflective surface on the reverse side, wherein a ray of the image light from the object plane enters through the first mirror face of the roof mirror into the optical member and then emits from the optical member to arrive at the image plane through the second mirror face of the roof mirror.

2. A projection device as claimed in claim 1, wherein said optical member forms an erecting real image on the image plane at the longitudinal direction of the slit and an inverted real image on the image plane at the lateral direction thereof.

3. A projection device as claimed in claim 1, wherein the reflective surface is a toric surface.

4. A projection device as claimed in claim 1, wherein the reflective surface is a roof mirror surface with edge line extending in the lateral direction of the slit.

5. A projection device as claimed in claim 1, wherein the toric refractive surface has a refractive power at least in the longitudinal direction of the slit.

6. A projection device as claimed in claim 1, wherein the optical member further includes at least one cylindrical lens positioned in the optical path, extending to the length of the slit and having a refractive power in the lateral direction of the slit.

7. A projection device as claimed in claim 1 further comprising a pair of cylindrical lenses each disposed adjacent to the object plane and the image plane to condense the ray of light from the object plane and to the image plane.

8. A projection device for projecting an image of an original on an object plane to an image plane through slit exposure comprising:

a roof mirror positioned between the object plane and the image plane and having a first mirror face opposed obliquely to the object plane and a second mirror face opposed obliquely to the image plane; and an optical member opposed to the roof mirror and including a plurality of lens elements linearly aligned in the longitudinal direction of the slit with blocking of the light between lens elements, said lens elements having a first toric surface on the side facing to the roof mirror and a second toric surface on the reverse side, said first toric surface having a refractive power in the longitudinal direction of the slit, said second toric surface having a refractive power in the lateral direction of the slit and mirror property reflecting a ray of light from the first toric surface to the same, wherein a ray of the image light from the object plane enters through the first mirror face of the roof mirror into the optical member and then emits from the optical member to arrive at the image plane through the second mirror face of the roof mirror.

9. A projection device as claimed in claim 8, wherein said optical member forms an erecting real image on the image plane at the longitudinal direction of the slit and an inverted real image on the image plane at the lateral direction thereof.

10. A projection device as claimed in claim 8, wherein said first and/or second toric surface is a cylindrical surface.

11. A projection device as claimed in claim 8, wherein the cylindrical surface is aspherical.

12. A projection device as claimed in claim 8, wherein said second toric surface has a curvature radius in the longitudinal direction of the slit less than a curvature radius in the lateral direction of the slit.

13. A projection device as claimed in claim 8 further comprising a pair of cylindrical lenses each disposed adjacent to the object plane and the image plane to condense the ray of light from the object plane and to the image plane.

14. A projection device for projecting an image of an original on an object plane to an image plane through slit exposure comprising:

a roof mirror positioned between the object plane and the image plane and having a first mirror face opposed obliquely to the object plane and a second mirror face opposed obliquely to the image plane; and an optical member opposed to the roof mirror and including a plurality of lens elements linearly aligned in the longitudinal direction of the slit with blocking of the light between lens elements, said lens elements having a toric reflective surface on the side facing to the roof mirror and a roof reflective surface with edge line extending in the lateral direction of the slit on the reverse side, wherein a ray of the image light from the object plane enters through the first mirror face of the roof mirror into the optical member and then emits from the optical member to arrive at the image plane through the second mirror face of the roof mirror.

15. A projection device as claimed in claim 13, wherein said optical member forms an erecting real image on the image plane at the longitudinal direction of the slit and an inverted real image on the image plane at the lateral direction thereof, without forming intermediate image.

16. A projection device as claimed in claim 13, wherein said optical member further including at least one cylindrical lens extending in the longitudinal direction of the slit and having a refractive power in the lateral direction of the slit.

17. A projection device as claimed in claim 15, wherein the toric refractive surface of the lens element is a cylindrical surface having a refractive power in the longitudinal direction of the slit.

18. A projection device as claimed in claim 15, wherein at least one of the cylindrical lens is positioned between the roof mirror and the toric refractive surface.

19. A projection device as claimed in claim 15, wherein the cylindrical lenses are positioned between the roof mirror and the object and image plane.

* * * * *